Feb. 19, 1929.
G. C. DU BOIS
1,702,294
PISTON RING
Filed Aug. 13, 1926
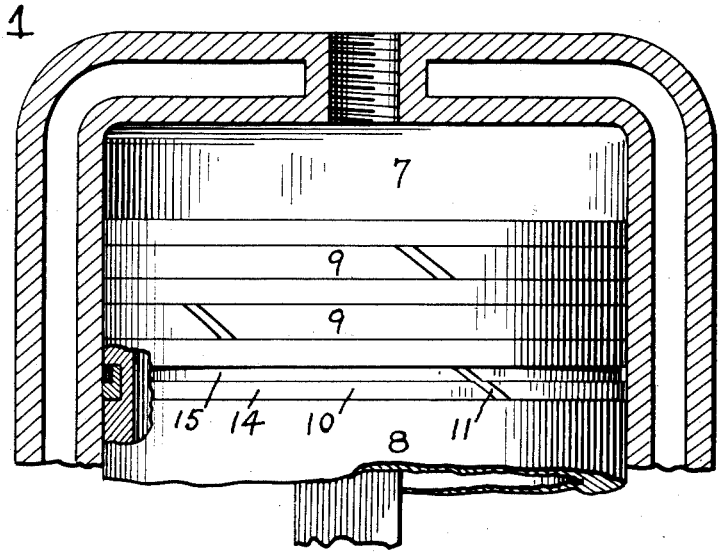
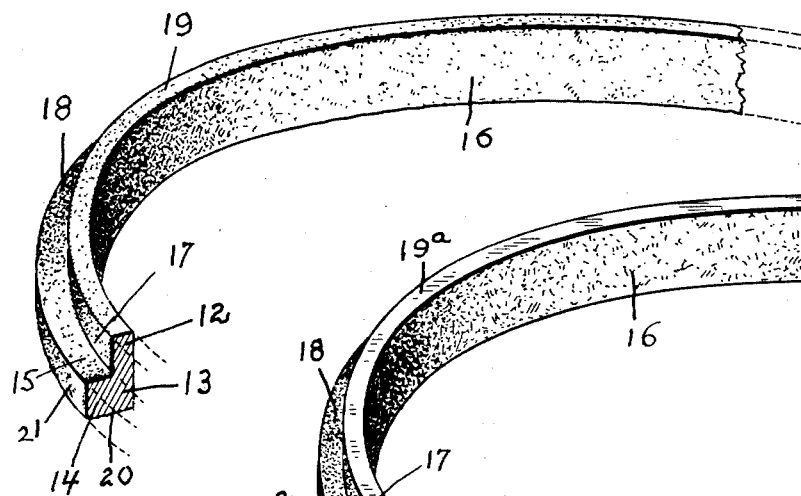
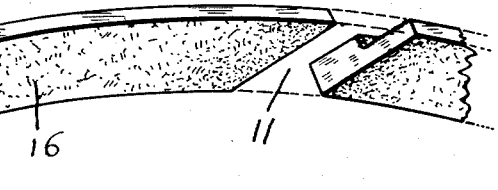
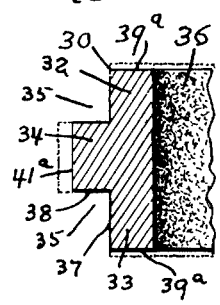
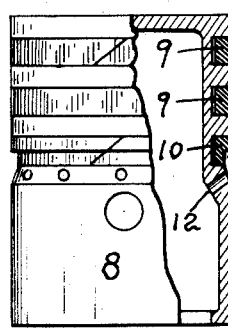
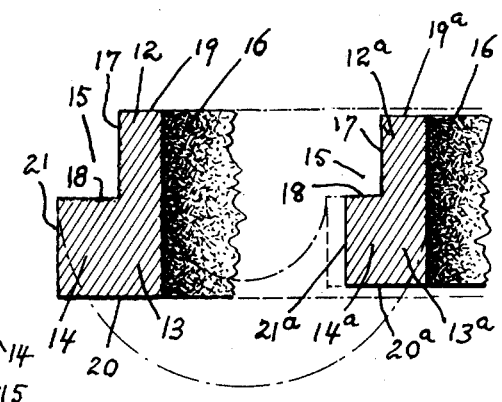
Inventor
George C Du Bois
by Rogers, Kennedy + Campbell,
Attys.

Patented Feb. 19, 1929.

1,702,294

UNITED STATES PATENT OFFICE.

GEORGE C. DU BOIS, OF ALBANY, NEW YORK.

PISTON RING.

Application filed August 13, 1926. Serial No. 129,055.

This invention relates to piston rings, more especially to the packing rings used in the pistons of internal combustion motors, which, owing to continual increase in operating speeds present constant problems of efficiency and maintenance of the piston rings. While certain features of the present invention are applicable to various kinds of piston rings, including the ordinary compression ring, the invention is especially useful in connection with oil control rings, for example the lowest of the three rings illustrated in the prior patent of Du Bois et al., No. 1,450,160 of March 27, 1923.

The objects of the present invention include affording increased strength and resilience in piston rings as well as increased life or durability of the expansive force. Another object is increasing and prolonging the wearing qualities of the piston ring. By these advantages the piston ring is rendered adaptable to the present higher speeds of motors and piston travel. A further object is to simplify the manufacture of piston rings and thereby reduce the cost thereof both as to labor and material. In connection with the oil control feature the present invention gives materially increased efficiency of action as well as prolonging the life of the control. Other and further objects and advantages of the present invention will be explained in the hereinafter following description of certain embodiments thereof or will be understood to those skilled in the subject.

To the attainment of the objects and advantages referred to the present invention consists in the novel piston ring and the novel features of method, production, construction, arrangement and detail herein illustrated or described.

In the accompanying drawings Fig. 1 is an elevation view partly in central section of an engine cylinder containing a piston carrying piston rings embodying the present invention.

Fig. 2 is a partial perspective view of the rough or unfinished casting adapted for the manufacture of an oil control piston ring embodying the present invention.

Fig. 3 is a partial perspective view similar to Fig. 2, but showing the finished oil control piston ring.

Fig. 4 is a comparative diagram indicating the changes produced in converting the rough casting into the finished piston ring.

Fig. 5 shows a modification in the form of the piston and in the relative arrangement of the oil control piston ring which is here inverted as compared with Fig. 1.

Fig. 6 shows a modification in which the oil control ring is of different cross section having two instead of one peripheral recess or groove.

Referring first to Fig. 1 the cylinder 7 is shown as enclosing the reciprocating piston 8, the explosion space or combustion chamber being above the piston and the usual crank case preferably below the piston, with a piston rod connecting the piston and crank.

The piston is shown as formed with a number of peripheral grooves in which are contained ordinary compression rings 9 and an oil control ring 10 which is preferably the lowest of the rings, meaning the nearest to the crank case.

The characteristics of the oil control ring, as described in said prior patent, are substantially as follows. It is peripherally recessed by a groove of substantial width and depth yet not so extensive as to seriously reduce the cross section of the metal of the ring or to injuriously impair its resilient strength and spring expansion. The peripheral part of the ring not so grooved forms an external flange and affords a reduced bearing contact or area against the cylinder wall, the result of which is to increase the degree of pressure or tightness of contact against the cylinder so as to give a closer fit and an oil scraping action by the ring. This permits only the desired thin oil film on the cylinder wall and operates to exclude excess of oil from the combustion chamber, the surplus oil being constantly scraped downwardly and forced back toward the crank case. The result of this is not merely a saving in the quantity of oil consumed per mile, but an elimination of smoking and an enhancing of the engine power and other advantages accruing to a proper limitation and control of the oil.

The usual mode of manufacturing a piston ring of cast iron is to cast it with a large excess of metal and then machine it down to the desired finished dimensions, and this applies especially to the manufacture of oil control rings or other piston rings formed with peripheral recesses, grooves, etc. The result is a ring having surfaces of open and coarse grain of metal. The plan of the present invention is to avoid this method and the resulting product and to cast each individual ring separately, preferably under pressure, in a mold defining each surface to, or as nearly as possible to, the desired finished dimensions, thus giving a product in which the iron is more dense, close grained and springly and wherein the spring pressure or tension possesses longer life; this method also minimizing cost of material and labor and cheapening the method and product. In the case of the oil control ring a lighter ring is afforded because more metal can be omitted at the groove or recess, this in turn giving more effective control of excess oil and longer life of control. These advantages are especially true in case uneven or worn cylinder walls, and the effective life of cylinders is prolonged, despite such variations in bore because of the adaptability of the lighter and more resilient ring to respond to the variations as it traverses the cylinder.

The oil control ring 10 of Fig. 1 is shown in Fig. 2 in its rough and cast form as it comes from the mold, whereas Fig. 3 shows the finished product. The usual diagonal slit 11 is shown in Figs. 1 and 3. The ring is preferably cast from iron in a permanent or metal mold, and comes out with substantially true form and dimensions, and with surfaces which are even though unfinished or slightly rough. Any fins may have to be removed but the body of the casting is dense, close grained and free from blow holes and spongy spots. According to this invention these desirable qualities are utilized by originally casting the ring with dimensions no greater than the desired finished dimensions, except on those surfaces requiring an exact fit with the cylinder or piston and at those surfaces allowing the minimum metal for machining off to the final dimension, so as to preserve the dense and close grained quality.

Fig. 4 is a diagram permitting comparison of the cross sections of the rough cast ring and the finished ring, by means of construction circles.

Referring to the unfinished ring, shown in Fig. 2, and at the left side of Fig. 4, the metal cross section may be considered as comprising the upper part 12 of the body, the lower part 13 and the outward flange 14, the peripheral groove or recess 15 being exterior to the part 12 and above the part 14. The corresponding finished portions in Fig. 3 are marked 12$^a$, 13$^a$ and 14$^a$ respectively, seen also at the right side of Fig. 4.

The inner cylindrical surface 16 of the rough or unfinished ring, while cast as smooth as possible, is merely the natural surface as it comes from the mold, practically unfinished unless for cleaning, scraping or slight truing insufficient to remove the desirable surface metal or impair the desirable characteristics of the natural cast surface of the metal. These characteristics are that the metal at and adjacent the cast surface possesses greater density than interior metal, is closer grained and possesses better spring tension and expansive force. In Fig. 3 it will be seen by comparison that the unfinished interior surface 16 is substantially retained. See also Fig. 4. So also the outer surface 17 of the upper body portion 12 is retained in its cast or unfinished condition. So also the unfinished upper surface 18 of the ring portion or flange 14 is retained in this condition as indicated in the finished ring. The upper surface 19 of the body portion 12, while unfinished in Fig. 2, is preferably machined or finished by removal of the minimum permissible quantity of metal as indicated by the finished surface 19$^a$ and by the comparison afforded by Fig. 4. So also the lower surface 20 of the rough cast ring is preferably finished by removal of minimum metal as indicated at 20$^a$. These two surfaces 19$^a$ and 20$^a$ are the ones engaging the sides of the groove cut in the cylindrical body of the piston, where an oil-excluding fit is desirable.

The rough cast surface 21 at the outer side of the flange 14 is preferably carefully machined as indicated at 21$^a$ so as to have the exact proper dimension and cylindrical form to engage the cylinder walls when the ring has been compressed into operating position. Again the finished surface is produced as close as possible to the original cast surface. This not merely preserves the strength and springy character of the metal, but affords a better wearing surface, with durable antifriction qualities. Experiments have shown that the piston ring bearing surface so produced is adapted to acquire a glassy surface, which not merely possesses antifriction qualities to a high degree, but minimizes the wear both on itself and on the cylinder.

The total amount of metal to be removed in finishing the piston ring hereof is relatively a small percentage, so that waste of metal is minimized, and a great saving in machine work effected, as well as affording the improved qualities of efficiency and durability already explained.

The modification shown in Fig. 5 is substantially the same in principle. The piston 8 has the upper two compression rings 9, as before, with an oil control ring 10 below them, but in this case the lowest ring 10 is inverted so that the peripheral recess or groove 15 is below the external flange 14. On each downward stroke of the piston the flange scrapes the oil downwardly and the oil passes from the groove through discharge holes 12 leading through the piston wall into the interior of the piston, so that the surplus oil is thus removed from the cylinder and returned to the crank case.

The modification shown in Fig. 6 differs mainly in that the oil control ring 30 is shown as having its outward flange 34 neither at the lower edge of the ring as in Fig. 1, nor at the upper edge as in Fig. 5, but at a middle position between the body portions 32 and 33. Thus there are two peripheral grooves or recesses 35 separated by the peripheral flange 34. The inner surface 36 is an unfinished cast surface as before. The outer surface of the flange 34 is a finished or machined surface 41ª as are also the top and bottom surfaces 39ª of the ring, whereas the surfaces bounding the grooves 35, namely the surfaces 37 and 38 are unfinished surfaces.

Each of the compression rings 9 may be cast with its interior cylindrical surface of the desired final dimension and the exterior and top and bottom surfaces as near as possible thereto but slightly larger for machining down slightly to the final form and dimension.

It will be observed that the method of manufacturing a piston ring in accordance with this invention comprises casting it of a form and size with one or more of the surfaces, including the interior surface, of the desired working dimension, and the remaining surfaces closely approximate thereto, and machining the ring to form or size by removing the minimum of surface metal at the bearing surfaces of the ring. The resulting product is a cast piston ring having a plurality of its component surfaces in the unfinished condition produced in the casting thereof, including the interior cylindrical surface, and the remaining surfaces closely adjacent to the original position of the cast surfaces. As an oil control ring the product shown in the drawings may be described as comprising a cast body with an exterior flange of less height than the body, the body and flange bounding a peripheral groove and having unfinished cast surfaces facing such groove; also the body having an unfinished interior surface while the remaining or bearing surfaces of the ring are finished to their working dimensions.

There has thus been described a piston ring, and the method of making the same, embodying the principles and attaining the advantages of the present invention. Since various matters of operation, arrangement, combination and design may be modified without departing from the principles of the invention, it is not intended to limit the same to such matters except so far as set forth in the appended claims.

What is claimed is:

1. A piston ring of form having a peripheral recess, the same cast to the recessed form and with the recess surfaces in the unfinished condition produced in casting and the peripheral metal portion dense and close grained.

2. A grooved piston ring having its periphery of high density, hardness and wearing qualities and consisting of cast metal cast to the grooved form, and with the surfaces facing the groove left in their unfinished condition produced in casting.

3. An oil control piston ring having its peripheral working surface reduced by a circumferential recess, and consisting of metal cast to the recessed form and with the recess sides in unfinished condition, whereby the ring is of high strength and resilience and its wearing surface of high hardness and density.

4. The method of manufacturing a peripherally recessed piston ring comprising casting the ring approximately to its working dimensions including the recess, leaving the recess surfaces in unfinished condition and finishing the working surface by removal of minimum surface metal.

In testimony whereof, I have affixed my signature hereto.

GEORGE C. DU BOIS.